US010751918B2

(12) United States Patent
Maguire et al.

(10) Patent No.: US 10,751,918 B2
(45) Date of Patent: *Aug. 25, 2020

(54) VACUUM DRYING METHOD AND APPARATUS

(71) Applicants: Maguire Products, Inc., Aston, PA (US); Stephen B. Maguire, West Chester, PA (US)

(72) Inventors: Stephen B. Maguire, West Chester, PA (US); Michael E. Gera, Aston, PA (US)

(73) Assignee: Maguire Products, Inc., Aston, PA (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/981,080

(22) Filed: May 16, 2018

(65) Prior Publication Data
US 2018/0264684 A1 Sep. 20, 2018

Related U.S. Application Data

(60) Continuation-in-part of application No. 14/693,951, filed on Apr. 23, 2015, and a continuation-in-part of application No. 14/272,721, filed on May 8, 2014, now abandoned, which is a division of application No. 11/402,492, filed on Apr. 11, 2006, now Pat. No. 8,776,392, which is a division of application No. 09/883,837, filed on Jun. 18, 2001, now Pat. No. 7,234,247.

(Continued)

(51) Int. Cl.
F26B 5/04 (2006.01)
B29B 13/06 (2006.01)
B29B 9/16 (2006.01)
F26B 17/12 (2006.01)
B29C 31/06 (2006.01)
B01F 15/00 (2006.01)
B29B 7/00 (2006.01)
B29B 13/02 (2006.01)

(52) U.S. Cl.
CPC ...... B29B 13/065 (2013.01); B01F 15/00805 (2013.01); B29B 7/005 (2013.01); B29B 9/16 (2013.01); B29B 13/02 (2013.01); B29C 31/061 (2013.01); F26B 5/04 (2013.01); F26B 5/042 (2013.01); F26B 17/128 (2013.01); *F26B 2200/08* (2013.01)

(58) Field of Classification Search
CPC ....... B29B 13/065; B29B 13/02; B29B 13/06; B29B 9/16; B29C 31/061; F26B 5/042; F26B 5/04; F26B 5/041; F26B 17/128; F26B 2200/08
USPC ............ 34/409, 406, 410, 417, 92, 201, 202
See application file for complete search history.

(56) References Cited

U.S. PATENT DOCUMENTS 3,597,850 A * 8/1971 Jenkins ................. B29B 13/065
34/361
4,179,819 A * 12/1979 Pryor .................... B29B 13/065
34/385

(Continued)

Primary Examiner — John P McCormack
(74) Attorney, Agent, or Firm — Fox Rothschild LLP

(57) ABSTRACT

Method and apparatus for drying granular resin material by drawing vacuum over heating resin material in a vessel, while periodically purging the vessel with the material therein with dry air and bathing the vacuum dried material with dry air until furnished to a processing machine.

20 Claims, 3 Drawing Sheets

Related U.S. Application Data

(60) Provisional application No. 61/986,266, filed on Apr. 30, 2014, provisional application No. 60/212,112, filed on Jun. 16, 2000.

(56) References Cited

U.S. PATENT DOCUMENTS

| 5,487,225 A * | 1/1996 | Downie | B29B 13/065 |
|---|---|---|---|
| | | | 34/473 |
| 2010/0170102 A1 * | 7/2010 | Chih | F26B 5/04 |
| | | | 34/216 |

* cited by examiner

VACUUM DRYING METHOD AND APPARATUS

CROSS-REFERENCE TO RELATED PATENT APPLICATIONS

This patent application is a 35 USC 120 continuation-in-part of co-pending U.S. patent application Ser. No. 14/693,951 entitled "Method and Apparatus for Vacuum Drying Granular Resin Material", filed 23 Apr. 2015 in the names of Stephen B. Maguire and Michael E. Gera.

The '951 application claimed the benefit of the priority of U.S. provisional patent application Ser. No. 61/986,266 entitled "Vacuum Dryer for Granular Plastic Resin Material" filed 30 Apr. 2014 in the name of Stephen B. Maguire.

This patent application is also a 35 USC 120 as a continuation-in-part of co-pending U.S. patent application Ser. No. 14/272,721 entitled "Simultaneous Resin Drying and Molding", filed 8 May 2014 in the name of Stephen B. Maguire.

The '721 application was a 35 USC 120 division of U.S. patent application Ser. No. 11/402,492, entitled "Resin Drying Method and Apparatus", filed 11 Apr. 2006 in the name of Stephen B. Maguire, which issued as U.S. Pat. No. 8,776,392 on 15 Jul. 2014.

The '492 application was a 35 USC 120 division of U.S. patent application Ser. No. 09/883,837, entitled "Low Pressure Dryer" filed 18 Jun. 2001 in the name of Stephen B. Maguire, which issued as U.S. Pat. No. 7,234,247 on 26 Jun. 2007.

The '837 application claimed the benefit of the priority of U.S. provisional patent application Ser. No. 60/212,112 entitled "Multi-Station Dryer and Apparatus" filed 16 Jun. 2000 in the name of Stephen B. Maguire.

The benefit of the priority of the '951, '266, '721, '492, '837 and '112 applications is claimed for this patent application under 35 USC 120.

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

BACKGROUND OF THE INVENTION

Field of the Invention

This invention relates to drying granular or powdery material, preferably granular resin material, prior to processing thereof into intermediate or finished plastic products, preferably by extrusion or molding.

Description of the Prior Art

Plastic resins are initially granular materials and are produced in pellets. These pellets are processed by extrusion or other means in which the granular resin pellets are heated until the pellets melt and are then molded or extruded into a desired shape. Typically granular resins melt at elevated temperatures, for example from 300-400° F., which is well above the boiling point of water.

Many granular resins have affinity for moisture. These hydroscopic resins absorb moisture and cannot be properly processed by molding or extrusion until dried. If processed before they are dry, moisture in the resin boils at or approaching the high plastic molding or extrusion process temperature, leaving bubbles and perhaps other imperfections in the finished plastic product. Hence, hydroscopic granular resins must be dried prior to molding or extrusion.

Some granular resin materials are extremely hydroscopic and become unprocessable by molding or extrusion in ten minutes or less after exiting a dryer, due to the rapid absorption of moisture by the granular resin material.

It is known to dry granular resin material by placing the granular resin material pellets on large shallow trays to a depth of one or two inches, and putting those trays into ovens for several hours. With this approach to granular resin material drying, drying temperatures of up to 150-180° F. but no higher can be used since many granular resin materials begin to soften at 200-210° F.

During the drying process, the granular resin material cannot be permitted to soften, since it becomes unmanageable. Once granular resin material begins to soften, at temperatures above the boiling point of water, the granular resin material pellets stick together in lumps or even melt into useless masses of solid plastic, making it impossible to further process the resin material into a useful article.

U.S. Pat. No. 6,154,980 represents a substantial improvement in dryer technology providing vacuum-based methods and vacuum drying apparatus which substantially accelerate the drying process, providing greater throughput of dried granular resin material at lower cost than known heretofore.

SUMMARY OF THE INVENTION

In one of its aspects, this invention provides a method for continuously supplying dried granular resin material for processing from a supply of material which is excessively moist where the method preferably includes substantially simultaneously performing the steps of (i) heating a portion of the moist granular resin material to a selected temperature at which moisture evaporates from the granular resin material when the material is exposed to a preselected level of vacuum; (ii) drawing the preselected level of vacuum over a second portion of the granular resin material which has been heated to the selected temperature for time sufficient to cause the moisture to evaporate therefrom and result in the second portion of granular resin material being at the preselected dryness while optionally supplying at least one short burst of heated dry air, preferably at the conclusion of the drying cycle, to the drying material to achieve an even greater degree of dryness; and (iii) supplying to granular resin material processing equipment from an inventory position granular resin material which was dried to the preselected dryness by evaporation in the preselected level of vacuum after having been heated to the selected temperature, and sequentially and repeatedly replacing each portion by the next succeeding portion.

In another of its aspects this invention provides apparatus for drying granular or powdery material prior to molding or extrusion where the apparatus includes a first material processing chamber, a second material processing chamber, manifold means for furnishing material to be dried selectably to one of said first and second processing chambers preferably most recently having had dried material evacuated therefrom, means for heating material in a selected one of said first and second processing chambers into which material needing to be dried has been introduced, means for drawing vacuum over material in a selected one of said first and second processing chambers preferably having had said material most recently heated therein and means for withdrawing material from said chamber preferably having most recently dried material therein.

In yet another of its aspects this invention provides a method for drying granular powdery material prior to molding or extrusion where the method includes feeding a first portion of material to a first processing chamber, heating the material in the first processing chamber to a preselected temperature, drawing vacuum over the material in the first processing chamber, feeding a second portion of material to a second processing chamber, heating the material in the second processing chamber while the first portion of material has vacuum drawn thereover, withdrawing material from the first processing chamber when needed for molding or extrusion, and drawing vacuum over the heated material in the second processing chamber thereby to evacuate moisture from said material and prepare such material for molding or extension.

In yet another of its aspects this invention provides a method for supply of dried granular resin material for processing from a supply of material which is excessively moist where the method includes heating a portion of the moist material to a temperature at which moisture evaporates at a preselected level of vacuum, drawing at least the preselected level of vacuum over a second portion of the material which has been heated to a temperature and for a time sufficient to cause the moisture to evaporate therefrom and result in the second portion of material reaching a preselected dryness while periodically introducing hot air into the second portion of material under the preselected vacuum to purge moist air from around such material, and supplying to granular material processing equipment for molding or extrusion a third portion of the material which has been dried to the preselected dryness by moisture evaporation in the preselected level of vacuum after having been heated.

This invention uses gravity to move granular plastic resin material in a vacuum dryer. The granular plastic resin material preferably is heated in a top heating hopper. The granular plastic resin material is then preferably dropped into a vacuum chamber. From the vacuum chamber the granular plastic resin material is preferably dropped into a retention hopper.

A plastic product manufacturing process, either molding or extrusion, can preferably draw dry granular plastic resin material from the retention chamber as required, while the heating hopper and the vacuum chamber preferably continuously prepare subsequent batches of granular plastic resin material. The preferable essentially straight down processing and drying of granular plastic resin material results in a much lower cost dry granular plastic resin material as compared to granular plastic resin material dried using known vacuum and other types of dryers.

In the invention, preferably at least one slide gate selectably allows and blocks granular plastic resin material downward flow from one part of the dryer to another. Costs are reduced by about forty percent and drying capacity is actually higher in the advantageously small footprint dryer embodying this invention. The small footprint afforded by the vertical, "stacked" configuration of the dryer is advantageous in that space in a plastic manufacturing processing plant, whether an extrusion operation or a molding operation, is often at a premium.

The vacuum chamber of the granular plastic resin material dryer is preferably closed by at least one slide gate having a vacuum tight seal. The slide gate preferably closes and seals against an o-ring to provide a vacuum tight seal. Use of the slide gate avoids vacuum leakage that could occur from contamination that is present everywhere in a plastic molding or extrusion facility. With the slide gate, plastic dust, flakes, and pellets of granular plastic resin material do not interfere with the vacuum tight seal.

In one of its aspects, the invention introduces dry air into the vacuum chamber periodically. As moisture is released from the granular plastic resin material while under vacuum, a vacuum pump or other source of vacuum preferably continues to pull the resulting air-water vapor mixture from the vacuum chamber. Over several minutes, this mixture changes to become a very high percentage of water vapor relative to the air remaining in the chamber.

If the moisture in the form of water vapor is not purged from the vacuum chamber, when vacuum is released from the vacuum chamber the resulting "thin" but moisture-laden air would reenter the pellets of granular plastic resin material resident in the chamber and would reverse the drying that has occurred. To prevent this, in one of its aspects the invention preferably purges the vacuum chamber of moisture several times while vacuum is present. The invention preferably permits very dry purge air to enter the vacuum chamber and then draws the resulting mix of the very dry air and the water vapor-laden air carrying the moisture that has been drawn out of the resin pellets, out of the chamber.

When drying polyethyleneterephthalate ("PET"), which is used conventionally for beverage bottles, it is essential that moist ambient air not enter the vacuum chamber at the end of a vacuum cycle. The dry air purge allows effective drying of PET pellets.

To supply such dry purge air, in one of its aspects the invention preferably uses a separate dry air source. Suitable dry air can be obtained in several ways. Desirably in the practice of the invention in a preferred manner, the invention utilizes compressed air, which passes through at least one oil separator coalescing filter and a compressed air membrane dryer so that the air exiting the oil separator coalescing filter and the compressed air membrane dryer is extremely dry. This dry air is desirably heated to a desired level for introduction into the vacuum chamber. Since only a relatively small amount of dry air is required for purging the vacuum chamber, the compressed air membrane dryer can be very small and of very low capacity.

In one aspect of the invention, the hopper in which the granular plastic resin material is initially heated is preferably designed such that hot air enters the bottom of the hopper, passes upwardly through the granular plastic resin material resident in the hopper, and exits the hopper at the top. As the hot air is passing through the heating hopper, granular plastic resin material may be dropped from the bottom of the hopper into the vacuum chamber, while new granular plastic resin material is added at the top of the hopper. In one aspect of the invention, the heating hopper preferably holds sufficient granular plastic resin material to provide from three to five hours of residence time for the granular plastic resin material before exiting the bottom of the heating hopper. In this way, the granular plastic resin material is exposed to hot, dry air for from three to five hours, which is the time required for the granular plastic resin material to flow downwardly through the heating hopper.

The invention in a preferred manifestation does not dry the granular plastic resin material using "hot" air in the conventional sense. Hot air is used only to bring the granular plastic resin material up to a desired temperature. By carefully controlling the speed of a blower that moves the hot air, air flow is preferably adjusted so that the invention provides hot air preferably at the correct rate to heat the granular plastic resin material. Viewed differently, most of the useful heat, in terms of calories or BTUs, is removed from the hot or "heating" air before the heating air arrives at the upper surface of the granular plastic resin material in the heating chamber and is preferably allowed to escape.

In the invention, since the invention is not concerned with heating the granular resin material during the drying stage, the drying stage, namely the stage during which the pellets are exposed to vacuum in the vacuum chamber, is as short as possible, and may be as little as fifteen or twenty minutes, as contrasted to three to five hours of drying time required when using a conventional desiccant dryer.

Preferably, there is no air filter for the heating air in the invention. The heating air is preferably used only once and is preferably vented to the atmosphere after it has been used for heating and has given up most of its heat. Most preferably, the hearing air is not recirculated.

The single pass flow of heating air and the elimination of the need for a filter for the heating air is believed unique to this invention. Earlier vacuum dryer designs involved recirculation of air with filtering being required. In its most preferred manifestation, this invention eliminates the need for a filter by having the "heating" air pass through the granular plastic resin material only once. The invention further regulates the speed of the blower forcing the air through the material to avoid, to the extent possible, loss of unused, residual heat remaining in the "heating" air leaving the heating hopper. Blower speed is preferably adjusted so that only enough heated air, at a desired temperature for the resin material prior to drying, is fed to the heating hopper at the bottom so that the bottom portion of resin in the heating hopper reaches the desired final temperature to meet the appetite of the process machine, namely a molding machine or extruder, for dry granular plastic resin material to be molded or extruded.

In one of its aspects, this invention provides a method for drying granular resin material, prior to processing of the granular resin material by molding or extrusion, which includes heating granular resin material in a heating hopper, monitoring air temperature at the top of the heating hopper, and regulating introduction of heat to the hopper bottom based on monitored air temperature at the top of the heating hopper.

The method may further proceed by releasing heated granular resin material from the heating hopper for flow downwardly into a vacuum chamber while replenishing the heating hopper from above with fresh resin material, preferably in an amount substantially equal to that released into the vacuum chamber. The method preferably proceeds by drawing vacuum in the vacuum chamber, periodically purging the vacuum chamber interior with dry air while the chamber is under vacuum, draining resin material from the vacuum chamber into a retention hopper, and blanketing dried resin material in the retention hopper with dry air for so long as the material is resident therein.

Heating the granular resin material preferably further includes introducing dry heating air into the heating hopper at the heating hopper bottom.

In still another aspect of the invention, there is provided an improved method for drying granular resin material prior to processing thereof by molding or extrusion by loading granular resin material into a heating hopper from above the hopper, introducing heated air into the hopper at the hopper bottom, monitoring the temperature of the air leaving the hopper at a position above the resin material, and regulating the rate of heated air introduction into the hopper so that monitored temperature of air leaving the hopper does not exceed a preselected level.

In still another one of its aspects, this invention provides apparatus for drying granular resin material prior to molding or extrusion of the material. Desirably the apparatus includes a heating hopper, a vacuum chamber positioned below the heating hopper, and a retention hopper positioned below the vacuum chamber. A blower is provided for providing heating air as an air blanket for dried resin material in the retention hopper.

Figure 1:
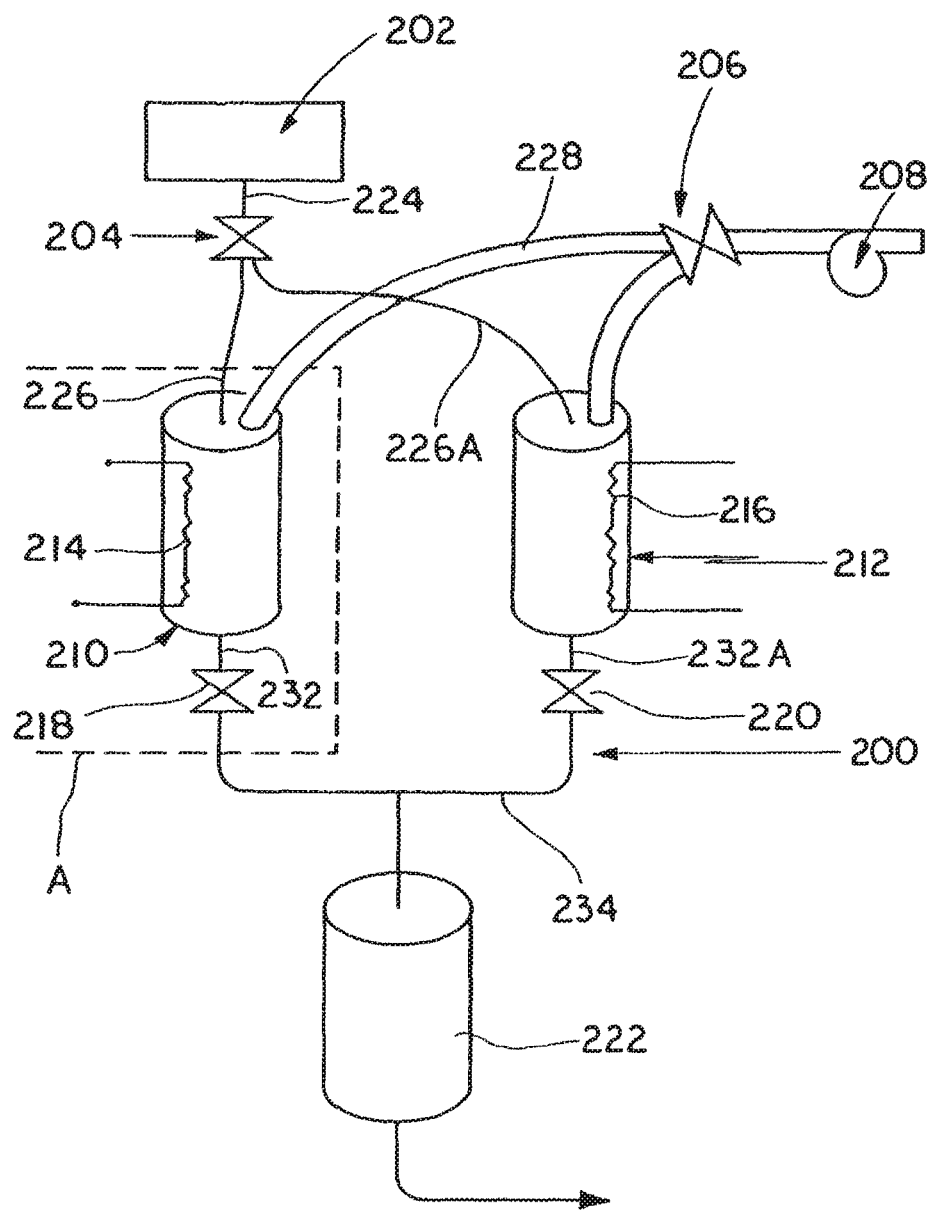
FIG. 1 is a schematic view of a dryer in accordance with the invention.

DESCRIPTION OF THE PREFERRED EMBODIMENT AND BEST MODE KNOWN FOR PRACTICING THE INVENTION

The dryers of the invention require less floor space than a conventional desiccant dryer having the same capacity. Additionally, there is no desiccant maintenance as there is in a conventional desiccant dryer thereby eliminating lost production time, which maintenance is required with a conventional desiccant dryer. Moreover, as desiccant material deteriorates, the quality of the plastic granular material being dried suffers. However, with the dryer of the invention in any of its embodiments, since there is no desiccant material involved there is no risk of deterioration of product quality from the desiccant material. Performance of dryers according to the invention remains constant and does not deteriorate over time.

Dryers according to the invention shorten drying time relative to desiccant dryers thereby avoiding prolonged exposure of the granular resin material to heat. This helps to maintain desired physical properties of the resin material.

Dryers according to the invention reduce labor costs in that clean-out time for hoppers for a color or material change is minimal. Typically, a dryer according to the invention requires less than ten minutes of total time to clean whereas a conventional desiccant dryer can take up to one hour for cleaning.

Desiccant dryers typically require material feed hoppers to be at least half full for proper air flow. Hence if material usage is low for particular molding operation, extended exposure to heat in a conventional desiccant dryer may degrade the plastic resin molding material. There is no such requirement for a full canister for the dryers in accordance with the invention to operate properly.

Test data reveals that operating costs of dryers according to the invention are less than one-half that of a desiccant dryer having the same capacity. In many cases operating cost is reduced by as much as 80% over that of a desiccant dryer having the same capacity. Additionally, startup time using a dryer in accordance with the invention is under one hour whereas typical desiccant dryers require four hours or more for startup.

Use of dryers in accordance with the invention permits material changeover time to be reduced to zero if the operator plans about one hour ahead. Color changes in material can be made "on the fly" with no lost time simply by changing the material. When dryers in accordance with the invention operate on a 20-minute cycle, unused inventory of blended material represents at most 40 minutes of dryer time, not four hours as is the case with a conventional desiccant dryer.

Dryers in accordance with the invention minimize the need to expose material to be dried to high heat for extended periods, dramatically eliminating or minimizing the loss of important physical properties which some materials experience when exposed to high heat for extended periods.

Dryers in accordance with the invention permit drying of plastics at lower temperatures than known heretofore; PET heretofore has had to be dried at about 350° F. (180° C.) but with dryers in accordance with the invention PET can be dried at 245° F. (120° C.)

No cooling water is required for the dryers in accordance with the invention.

The lower temperature at which the dryers in accordance with the invention operate allows addition of color concentrates to resin materials prior to drying rather than afterwards.

Another problem addressed by the dryers in accordance with the invention is the separation of preblended materials during extended residence times in large hoppers. The chambers of dryers in accordance with the invention are typically lower in volume than conventional desiccant dryers and may fill and may empty in distinct and complete batches thereby eliminating the problem of material separation.

The dryers in accordance with the invention require less floor space than a desiccant dryer having similar capacity.

The dryers of the invention do not require and do not utilize a dew point meter or a dew point control, both of which are subject to reliability problems but are necessary with desiccant dryers.

Dryers in accordance with the invention preferably operate using an air supply from 75 to 80 psi. This air, which is typically from the air supply in the facility in which the dryer is used, serves to generate the required vacuum as well as operate all of the air cylinders of the dryer. To conserve usage of facility air, the venturi vacuum generator in a dryer of the invention is desirably cycled on and off during operation to maintain a minimum vacuum of 25 inches. For large installations, a vacuum pump may be substituted for the venturi vacuum generator.

The microprocessor controllers of the dryers preferably include thumbwheel switches or functionally equivalent structure, which are used to set temperature to which the resin or other granular material is to be heated prior to drying. Another thumbwheel switch or functionally equivalent structure is preferably used to set the minimum acceptable time for a heating cycle and a drying cycle. Typically 20 minutes is the cycle time for acrylic, ABS and polycarbonate while 40 minutes is the cycle time for PET.

FIG. 1 schematically depicts a vacuum dryer embodying aspects of the invention where the vacuum dryer is designated generally 200. A material supply container 202 or equivalent structure is provided as indicated schematically at the top of FIG. 1; material supply container 202 need not be a part of vacuum dryer 200.

A preferably tubular material feed line 224 or equivalent structure leads out of material supply 202, preferably downwardly, and connects to a material flow control valve or equivalent structure depicted schematically as 204 in FIG. 1.

Material flow control valve 204 provides material to either of two material feed lines 226, 226A, or equivalent structure, which lead to respective ones of first and second material processing chambers 210, 212 or equivalent structure, both of which are illustrated as vertically oriented cylindrical processing chambers in FIG. 1. Other geometric configurations and shapes may also be used.

First and second material processing chambers 210, 212 are equipped with means for heating granular material, such as plastic resin, delivered thereinto via material feed lines 226, 226A. The heating means may be one or more electrical resistance heaters as illustrated schematically and designed 214, 216 in first and second material processing chambers 210, 212. Alternately and preferably hot air is blown through first and second material processing chambers 210, 212 to effectuate heating of material contained therewithin.

Vacuum dryer 200 further includes a vacuum pump or equivalent structure designated generally 208. Vacuum pump 208 draws vacuum within a selected one of first and second material processing chambers 210, 212 according to the position of vacuum control valve 206 or equivalent structure, which is connected to draw vacuum created by vacuum pump 208 from a selected one of first and second material processing chambers 210, 212. Vacuum lines 228, 228A or equivalent structure connect first and second material processing chambers 210, 212 to vacuum pump 208. A further vacuum line 230 or equivalent structure connects control valve 206 to vacuum pump 208.

Preferably leading from the bottoms of first and second material processing chambers 210, 212 are a pair of outlet lines 232, 232A or equivalent structure, which in turn connect to first and second dried material flow control valves 218, 220 respectively. First and second dried material flow control valves 218, 220 or equivalent structure control downward flow of dried granular or powdery resin material from respective processing chambers 210, 212 into a reservoir 222 in which the dried granular material is retained until needed by the manufacturing process. Line 234 carries material released by valve 218 or 220 into reservoir 222. Material feed line 236 carries dried material as needed from reservoir 222 to a process machine for fabrication where the process machine is desirably either a molding press or an extruder.

During operation of vacuum dryer 200, moist granular material requiring drying is initially fed via valve 204 under the influence of gravity into the first material processing chamber 210. While in processing chamber 210, the granular resin material is heated, preferably by flow of hot air therethrough, until the material reaches a temperature at which vacuum is highly effective to evaporate moisture out of the material.

Once application of heat ceases, first material processing chamber is then sealed so vacuum can be drawn therein and vacuum pump 208 or equivalent structure actuated, with valve 206 or equivalent structure connecting vacuum pump 208 to first material processing chamber 210. Vacuum is drawn for sufficient time to evaporate the required amount of moisture out of the granular resin material within first material processing chamber 210.

While vacuum is being drawn over and moisture is being evaporated from the material in processing chamber 210, second material processing chamber 212 has preferably been filled with material and the granular resin material within chamber 212 is heated to the required temperature for vacuum-based evaporation of moisture therefrom.

Once the evaporation operation has been completed with respect to the material in chamber 210 and the heating has been completed with respect to the material in chamber 212 by virtue of that material having reached the required temperature for evaporation of moisture therefrom, the position of valve 206 may be switched so that vacuum pump 208 draws a vacuum within chamber 212 through conduits 228A and 230. During this time, dried material within chamber 210 may be evacuated via lines 232 and 234 by opening valve 218 so that material may flow downwardly into reservoir 222 and be stored therein until needed for processing by the process machine, to which that material may then be carried by line 236. Once first material processing chamber 210 is empty, chamber 210 may be refilled using material from supply 202 by appropriate positioning of valve 204 whereupon material may flow from supply 202 via conduits 224, 226 into chamber 210 and the process repeated.

Because evaporation of moisture under vacuum is temperature sensitive and increases greatly in rate with increasing temperature, little is gained by seeking to apply vacuum to the moist granular material before the material has been raised to the appropriate temperature. As a result, a "dual" vacuum dryer system, namely one having two material processing chambers in which one batch of material can be heated while a second batch of material (having already been heated to the desired temperature) is having vacuum drawn thereover and moisture evaporated therefrom, is a more efficient system in terms of the amount of dried material delivered per unit time than a system in which vacuum is drawn over the material as the material is being heated.

Vacuum dryer 200 illustrated in FIG. 1 is depicted schematically. First and second material processing chambers 210, 212 are desirably equipped with heated air inlet and outlet hoses, with vacuum inlet and outlet hoses and with vacuum sealing means of the type disclosed above respecting the invention.

Valve 204 functions as a manifold, preferably being connected to the first and second processing chambers 210, 212 and preferably selectably furnishes material to be dried to one of the two first and second processing chambers. Desirably, valve 204 acts as a manifold to furnish material to a selected one of first and second chambers 210, 212 most recently having dried material evacuated therefrom. Furthermore, it is desirable that first and second processing chambers 210, 212 have separate means for heating material in each of, or associated with, those two chambers.

The apparatus illustrated in FIG. 1 may be modified to utilize only a single material processing chamber, either 210 or 212, for both heating and vacuum drying. While this arrangement may be less expensive, it is also less efficient in that granular material to be dried cannot be effectively dried under vacuum until heating has been completed, as noted above.

Figure 2:
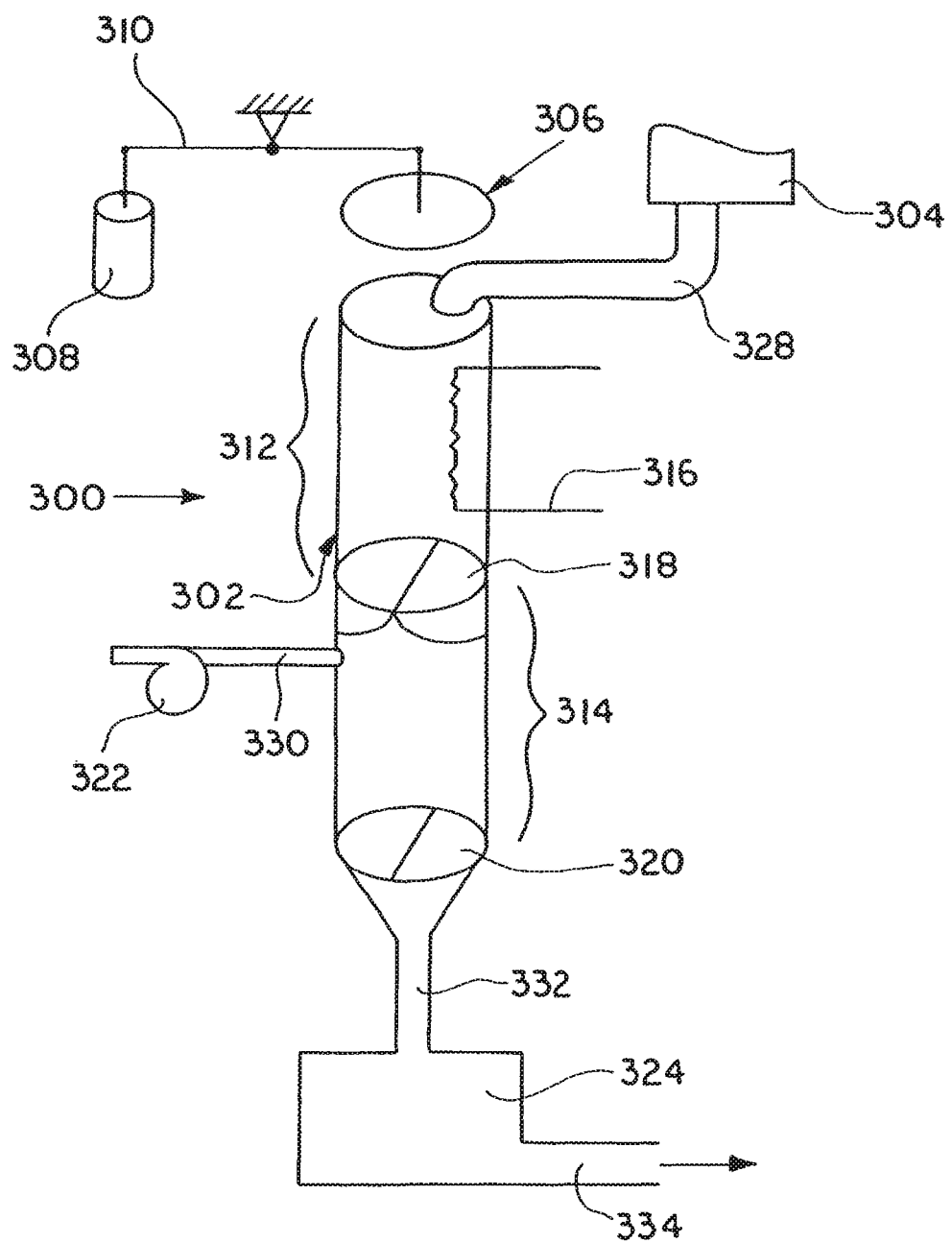
FIG. 2 is a schematic view of a second dryer in accordance with the invention.

A second embodiment of a vacuum dryer manifesting aspects of the invention is illustrated schematically in FIG. 2 with the vacuum dryer being designated generally 300 and including a material processing chamber designated generally 302.

A material supply container or equivalent structure is designated generally 304 and serves as a storage receptacle for granular or powdery material requiring drying; material supply container 304 need not be a part of dryer 300.

Material processing chamber 302 or equivalent structure is preferably equipped with a preferably sealing lid designated generally 306 and positioned to close an inlet end 326 of processing chamber 302 or equivalent structure. Sealing lid 306 is preferably moved by a preferably pneumatic actuating cylinder 308 connected to sealing lid 306 by a suitable pivoting arm 310. Upon actuation of cylinder 308, sealing lid 306 moves into position to seal inlet end 326 of processing chamber 302.

Granular resin or powdery material requiring drying is conveyed, preferably by gravity, from material supply 304 or equivalent structure to inlet end 326 of processing chamber 302 or equivalent structure via material conveying tube 328.

Material processing chamber 302 is preferably divided into two zones, a heating zone or equivalent structure designated generally 312 and a vacuum drying zone or equivalent structure designated generally 314. Zones 312, 314 are preferably separated by a sealing trap door or equivalent structure, such as a slide gate, which is designated 318 and referred to as a first sealing trap door within preferably cylindrical material processing chamber 302. Heating zone 312 is preferably adapted to heat granular or powdery material contained therewithin. An electrical resistance heater has been designated 316 and is shown schematically as a part of heating zone 312 to indicate the heating function; heating may also be and preferably is provided by hot air in the manner described above.

A vacuum pump 322 or equivalent structure is preferably connected to vacuum drying zone 314 of processing chamber 302.

The lower or exit end of vacuum drying zone 314 is preferably bounded by and defined by a second sealing trap door or equivalent structure designated generally 320 in the drawings. Second sealing trap door 320 preferably leads to a dried material discharge conduit 332 providing dried granular or powdery material to a reservoir 324 from which material may be supplied to a molding machine or extruder as required, preferably via outlet conduit 334.

During operation of the embodiment of the dryer apparatus illustrated in FIG. 2, a first portion of granular or powdery material to be dried is preferably advanced from a supply in material supply container 304 preferably through material inlet conveying tube 328 into heating zone 312 of material processing chamber 302. Once within heating zone 312, that first portion of material is heated, preferably by forcing or drawing hot air through the material. Temperature of the material is preferably regulated substantially in the same manner as described above, namely by comparing temperature of the air going into the material and temperature of the air coming out of the material; when those air temperatures are equal, the material is known to be substantially heated to the required temperature.

Once the first portion of heated material is known to be substantially at the required temperature, that first portion of material preferably is advanced from heating zone 312 preferably into vacuum drying zone 314 preferably by opening sealing trap door 318 or equivalent structure, such as a slide gate, separating heating zone 312 from vacuum zone 314 and allowing the heated material to fall due to gravity from heating zone 312 into vacuum drying zone 314.

Once the first portion of heated material has been evacuated from heating zone 312 into vacuum drying zone 314, a second portion of heated material preferably may be advanced from supply 304 via tube 328 into heating zone 312, whereupon heating of that batch of material may commence.

For the first portion of material which is now in vacuum drying zone 314, vacuum is preferably drawn over that first portion of material to dry the first portion of material while a second portion of material, which is now preferably in heating zone 312, is preferably heated.

Once drying of the first portion of material is substantially completed in vacuum drying zone 314, second sealing trap door 320 or equivalent structure preferably may be opened and the first portion of material, which is now dried to the required level, may preferably advance downwardly, preferably due to the force of gravity, through dried material discharge conduit 332, or equivalent structure, into reservoir 324 or equivalent structure in which the dried granular material is preferably stored until needed by the process machine.

These steps of advancing portions of granular material from the supply into the heating zone, heating of material in the heating zone while the next preceding portion of material is being dried in the vacuum drying zone, and then advancing the two portions of material successively from the drying zone into the reservoir and from the heating zone into the drying zone, may preferably be repeated until such time as no additional dried material is required by the process machine to which conduit 334 is connected or leads.

Figure 3:
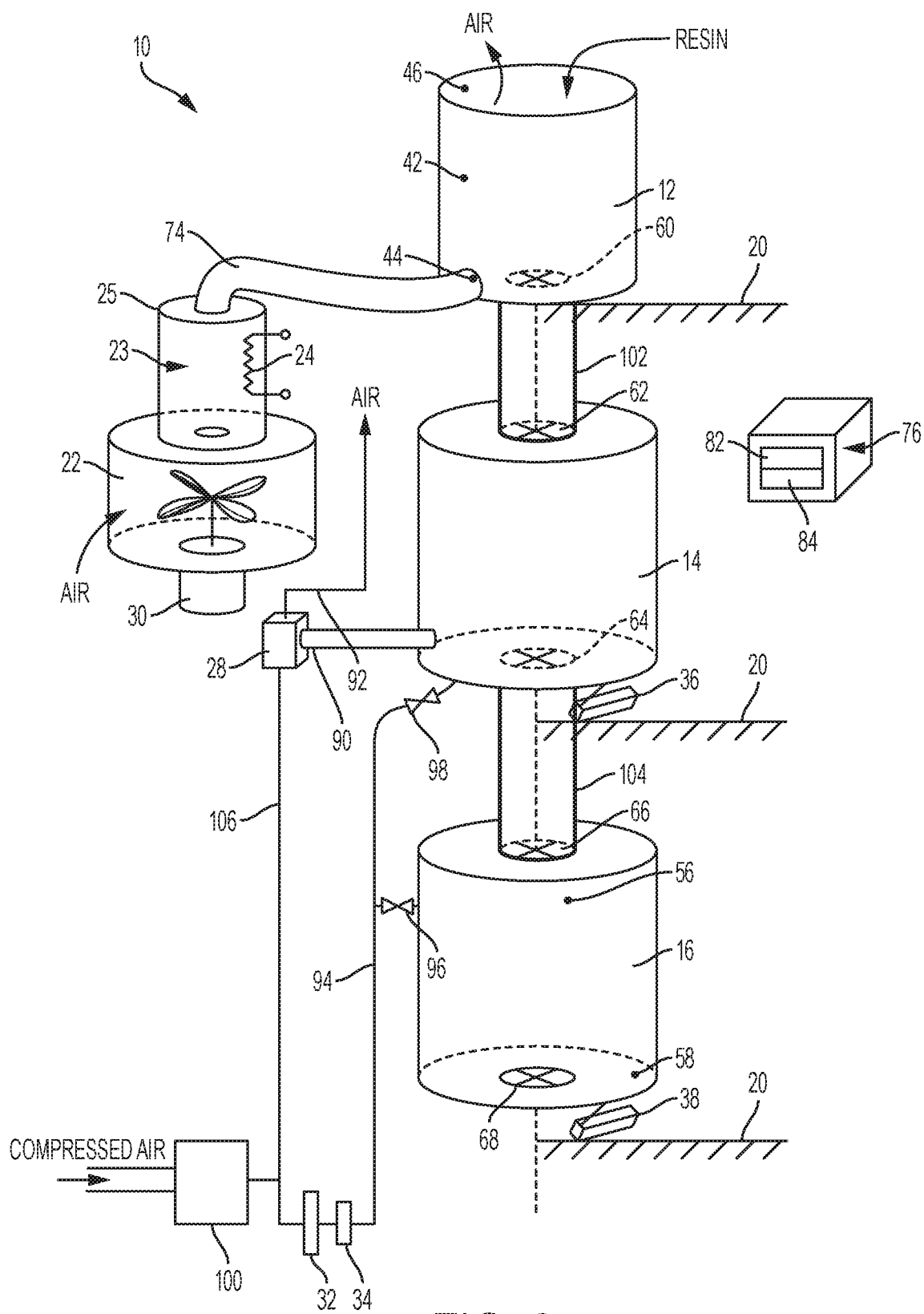
FIG. 3 is a schematic view of a third dryer in accordance with the invention.

Referring to FIG. 3, an air purge granular resin material vacuum dryer in accordance with the invention is shown schematically and designated generally 10. Air purge dryer 10 includes a heating hopper 12, a vacuum chamber 14, and a retention hopper 16, with the heating hopper being positioned above the vacuum chamber and the vacuum chamber in turn being positioned above the retention hopper 16, with the heating hopper 12, vacuum chamber 14, and retention hopper 16 being desirably vertically substantially aligned, as shown in FIG. 3.

Heating hopper 12, vacuum chamber 14, and retention hopper 16 are all preferably independently supported by a support frame designated 20 shown only schematically in FIG. 1. Preferably, heating hopper 12 does not rest on vacuum chamber 14. To the contrary, support frame 20 preferably supports heating hopper 12 above vacuum chamber 14 so that none of the weight of heating hopper 12 or any resin within heating hopper 12 is supported by vacuum chamber 14. Heating hopper 12 is desirably an insulated stainless steel hopper and can accommodate drying temperatures of up to 350° F. The heating temperature is adjusted or set on a control panel portion of controller 76.

Similarly, vacuum chamber 14 is preferably independently supported by support frame 20 so that none of the weight of vacuum chamber 14 is transferred to or borne by retention hopper 16. While support frame 20 has been depicted in FIG. 3 in three sections, it is to be understood that support frame 20 can be a single structural member so long as support frame 20 provides separate weight-bearing support for heating hopper 12, vacuum chamber 14, and retention hopper 16. While support frame 20 has been illustrated in the drawing as being under vacuum chamber 14, vacuum chamber 14 may also desirably and most preferably be suspended from above by a suitable frame member similar to schematic frame 20.

The vertically aligned "stacked" arrangement of heating hopper 12, vacuum chamber 14, and retention hopper 16, as depicted generally in FIG. 3, permits gravity-induced flow of granular plastic resin from heating hopper 12 downwardly into vacuum chamber 14, and from vacuum chamber 14 downwardly into retention hopper 16. Desirably, retention hopper 16 is supported by support frame 20 in a manner that retention hopper 16 is somewhat above floor level in the facility in which air purge dryer 10 is located. Having retention hopper 16 above the floor permits dried granular resin material to be supplied directly out of retention hopper 16 by gravity flow to a process machine such as a molding press or an extruder, or to a vacuum-powered or pneumatically powered resin distribution system within the processing facility. Support frame 20 has been illustrated in schematic form as supporting retention hopper 16, vacuum chamber 14 and heating hopper 12; desirably in addition to vacuum chamber 14 being mountable on rails and in a suspended disposition from support frame 20, heating hopper 12 and retention hopper 16 may both also be mounted on rails to facilitate movement and removal of heating hopper 12 and retention hopper 16 as needed for maintenance, etc.

Air for heating granular plastic resin within heating hopper 12 is preferably supplied by a centrifugal blower 22 that draws in ambient air and forces that ambient air through an air heating chamber 23, which preferably includes a heating element 24 positioned within an open ended cylindrical housing 25. The open ended cylindrical housing 25 is preferably a 6 inch diameter, 6 inch length stainless steel cylinder having suitable insulative material around the exterior thereof. Voltage applied to heating element 24 within cylindrical housing 25 causes heating element 24 to rise in temperature. Air passing along heating element 24, as blown through air heating chamber 23 by centrifugal blower 22, is heated by heating element 24 and exits air heating chamber 23 at the top of chamber 23 and travels via a hot air conduit 74 to heating hopper 12, where the hot air enters heating hopper 12 at the bottom thereof for upward passage through granular plastic resin material residing in heating hopper 12. A variable frequency drive 30 is provided for centrifugal blower 22 to modulate the speed of blower 22 and thereby control and adjust the amount of heating air, and therefore the amount of heat introduced into heating hopper 12.

Vacuum chamber 14 is mounted on support frame 20 with one or more load cells 36 between vacuum chamber 14 and support frame 20. Load cell 36 provides data to controller 76 as to the weight of vacuum chamber 20 and any granular plastic resin material being dried therein.

Similarly, retention hopper 16 is mounted on support frame 20 using one or more load cells 38 to provide data to controller 76 as to the weight of dried granular plastic resin material resident within retention hopper 38.

Temperature sensors are provided to monitor air temperature at the inlet connecting conduit 74 to heating hopper 12 and at the top of heating hopper 12, where the heated air, having given up most of its heat, is exhausted. The temperature sensor at the hot air inlet to heating hopper 12 is designated 44 in the drawings, while the temperature sensor at the outlet, at the top of heating hopper 12 where heated ambient air is exhausted, is designated 46.

A material level sensor 42 is provided in heating hopper 12. Level sensor 42 provides a signal indicating excessively low level of material in heating hopper 12. Controller 76 receives a signal from heating hopper level sensor 42 and in response to a low material level signal, controller 76 either actuates apparatus to provide granular resin material for replenishing heating hopper 12 or, if no material is available, controller 76 shuts down the air purge dryer 10.

A temperature sensor 56 within retention hopper 16 senses the temperature of the dry purge air with which dried granular resin in retention hopper 16 is blanketed. A granular resin material temperature sensor 58 may be provided at the bottom, close to the material outlet from retention hopper 16, to sense the temperature of the resin material being supplied from retention hopper 16.

Controller 76 desirably has two display screens. The upper screen 82, which desirably has a red background, shows actual temperatures and set point temperatures. The lower screen 84, which desirably has a blue background, shows various running mode information, set up information, and dryer configuration information, as selected by the operator using touch controls that are a part of controller 76 and are associated with the two screens.

One or more oil separator coalescing filters 32 are provided to remove entrained oil and some moisture from the compressed air supply. A compressed air membrane dryer 34 further dries the air and provides very dry purge air for vacuum chamber 14 and a dry air blanket for maintenance of dry conditions for granular resin material in retention hopper 16.

As operation of the air purge dryer begins, material in heating hopper 12 is brought up to temperature. The time for preheating is determined by a specified preheat time, which may be entered by an operator into controller 76, or by an automatic set-up option in controller 76 which establishes an inlet-to-outlet temperature difference for the air input to and exhausted by heating hopper 12, and a minimum preheat time. Once resin material in heating hopper 12 is up to temperature, as determined by the inlet-to-outlet temperature difference as measured by temperature sensors 44 and 46, and the temperature difference is supplied to controller 76, approximately one-third of the resin material in heating hopper 12 is dispensed into vacuum chamber 14. Once this occurs, a first vacuum drying cycle begins. Each vacuum drying cycle, namely the time a batch of resin material remains in vacuum chamber 14 under vacuum, has a minimum time that the material is maintained under vacuum. This time may be set by an operator using the inputs available on controller 76 or a default time of twenty (20) minutes may be used.

During normal operation, vacuum in vacuum chamber 14 is brought to a level of about 700 mm Hg and held to about a plus or minus 20 mm Hg differential for the vacuum cycle time. A typical vacuum cycle lasts from 15 to 20 minutes, depending on the material being dried.

As vacuum chamber 14 receives the heated granular resin material through first conduit 102 via operation of material flow control gates 60 and 62 and the vacuum cycle begins, a suitable loader, either human or mechanical, such as the loader that is the subject of U.S. Pat. No. 8,753,432, loads heating hopper 12 with new replenishment material, desirably concurrently with the start of the vacuum cycle. Granular resin material loaded into heating hopper 12 remains in heating hopper 12 for a minimum of the time for a vacuum cycle in vacuum chamber 14.

After completion of a vacuum cycle in vacuum chamber 14, granular resin material that has been dried in vacuum chamber 14 is dispensed downwardly through second conduit 104, via operation of material flow control gates 64 and 66, into retention hopper 16 and is ready for use. Dried granular resin material residing in retention hopper 16 and not immediately removed therefrom for molding or extrusion is blanketed with dry air so long as that granular resin material remains in retention hopper 16. The dry air blanketing the dried granular resin material remaining in retention hopper 16 is maintained under positive pressure and is desirably slightly heated so as to be warm. The dry air blanketing the dried granular resin material remaining in retention hopper 16 prevents that granular resin material from absorbing moisture, which would render the material unsuitable for subsequent processing by molding or extrusion.

The rate of consumption of dried granular resin material from retention hopper 16 dictates the time granular resin material will be heated in heating hopper 12 and dried under vacuum in vacuum chamber 14. For example, if thirty (30) minutes are required for operation of a process machine to deplete retention hopper 16, the vacuum cycle in vacuum chamber 14 will run past the normal twenty (20) minute set point and will last thirty (30) minutes. This is normal operation and does not in any way degrade the granular plastic resin that has been dried in vacuum chamber 14. However, if retention hopper 16 is depleted in fifteen (15) minutes due to being consumed by operation of a process machine and the time for a vacuum cycle in vacuum chamber 14 has been set to twenty (20) minutes, a five (5) minute window will result when no granular resin material is available for the process machine. This indicates that the throughput capacity of the dryer has been exceeded for the particular granular resin material being dried and the particular process machine being supplied. Upon such occurrence, controller 76 senses that retention hopper 16 is empty, that vacuum chamber 14 is still drying material, and with no material being available in retention hopper 16 for the associated process machine, controller 76 sounds an alarm.

Vacuum chamber load cell(s) 36 and retention hopper load cell(s) 38 allow controller 76 to always have in memory the current weight of material in the vacuum chamber and the current weight of material in the retention hopper. This permits calculation by controller 76 of throughput of granular resin material in pounds of resin material per hour.

Venturi vacuum generator 28 requires an operating air pressure of about 80 psi. The pressurized air is desirably supplied by an in-house air system.

A purge air inlet temperature sensor 56 is provided in retention hopper 16. A granular resin material outlet temperature sensor 58 is provided at the bottom of retention hopper 16. Both sensor 56 and sensor 58 provide temperature data to controller 76.

The desired temperature of air being outlet from the top of heating hopper 12 may be set in controller 76 such that once the temperature of air escaping from the top of heating hopper 12 reaches a desired level, centrifugal blower 22 and heating element 24 will shut down for a predetermined time period specified by an operator and programmed into controller 76 or until a vacuum cycle, which is under way, ends, whichever event comes first.

Fill and the fill rate for vacuum chamber 14 are controlled and may be adjusted by material flow control gates 60 and 62 above vacuum chamber 14 as actuated and controlled by controller 76. Similarly, material dump and material dump rate from vacuum chamber 14 can be controlled and adjusted by material flow control gates 64 and 66 below vacuum chamber 14 as actuated and controlled by controller 76. These parameters, namely vacuum chamber fill and fill rate and vacuum chamber dump and dump rate are programmable into controller 76. Similarly, the timing by which dry purge air is introduced into vacuum chamber 14 is desirably adjusted and controlled by controller 76. Typically during a twenty (20) minute vacuum cycle, purge air will be introduced into vacuum chamber 14 six (6) times.

Controller 76 controls and allows adjustment of the heat provided to heating hopper 12.

While the vacuum dryer of the invention produces dried material in batches, the dryer is a continuous supplier of suitably dry material for molding or extrusion. Dry material may be withdrawn from retention hopper 16 on a continuous basis. Vacuum chamber 14 preferably processes one batch of material every 20 minutes, which is sufficient to keep retention hopper 16 and any process machine being fed by retention hopper 16 supplied on a continuous basis.

The vacuum dryer of the invention uses fresh air without recycling any air in the dryer. Air coming into the dryer is used once and goes out of the dryer; there is no recycling of air in this embodiment of the invention.

The load cells, together with controller 76, facilitate tracking throughput of granular resin material by the vacuum dryer of the invention, permitting optimization of manufacturing parameters in the plastic molding or extrusion facility in which the dryer of the invention is located.

During operation, vacuum is drawn by Venturi vacuum generator 28 from vacuum chamber 14 via vacuum drawing conduit 90.

Incoming compressed air from the plastics molding or extrusion facility is supplied to pressure regulator 100 as indicated FIG. 3. This regulated pressurized air, with pressure regulated to a required level, is then supplied via regulated pressure air line 106, which splits as illustrated in FIG. 3 with one portion of line 106 leading to oil separating coalescing filter 32 and the other portion of line 106 leading to Venturi vacuum generator 28. An exhaust line 92 leads from Venturi vacuum generator 28 to ambient air.

Purge air is provided via purge air supply line 94 which exits compressed air membrane dryer 34 and supplies purge air in very dry form after exiting dryer 34 to both retention hopper 16 and to vacuum chamber 14. Introduction of purge air to retention hopper 16 is controlled by valve 96, which in turn is actuated by controller 76. Introduction of purge air to vacuum chamber 14 is controlled by vacuum chamber purge air valve 98, which in turn is also controlled by controller 76. The wiring for connection of valves 96, 98 and the other components to controller 76 is not illustrated in the drawing to enhance the drawing clarity.

Flow of granular plastic resin material downwardly from heating hopper 12 to vacuum chamber 14 is desirably through a first conduit 102. Flow of dried granular resin material from vacuum chamber 14 to retention hopper 16 is desirably through a second conduit 104. Conduits 102, 104 are respectively mechanically connected, preferably substantially air tightly, respectively to heating hopper 12, vacuum chamber 12 and retention hopper 16.

Gates 60, 62, 64, and 66 have been illustrated in FIG. 3 positioned respectively in the bottom of heating hopper 60, at the top and at the bottom of vacuum chamber 14, and at the top of retention hopper 16. These gates may desirably be positioned in respective first and second conduits 102, 104 according to the manner of selected construction for the flow through vacuum dryer.

It is desirable to have two gates, such as gates 60, 62, above vacuum chamber 14 to control downward flow of resin from heating hopper 12, with an upper gate 60 providing gross, course control and a lower gate 62 providing air tight vacuum sealing of the vacuum chamber. Use of the two gates, 60, 62, with course control afforded by upper gate 60, minimizes the possibility of resin material becoming stuck in gate 62 and thereby precluding gate 62 from making the vacuum tight seal required for effective operation of vacuum chamber 14 during the drying phase. Desirably, gate 62 is a slide gate providing a vacuum tight seal using a rubber gasket, with the movable slide portion of the gate closing against the rubber gasket and moving first in a direction laterally across, with respect to the direction of downward flow of resin, and then vertically parallel with the direction of downward flow of resin, with such horizontal and then vertical movement of the gate effectuated by the shape of the slot in which the slide gate moves.

Material gate 64 may similarly be a slide gate or may be a pivoting gasket-equipped gate actuated by an air cylinder with the gate pivoting downwardly to effectuate downward flow of dried plastic resin material out of vacuum chamber 14 upon the conclusion of the vacuum cycle. Use of a pivoting-type gate at gate 64 reduces cost over the cost of a slide gate since gravity will carry any residual granules of plastic resin material downwardly through second conduit 104 into retention hopper 16. Gates 60 and 66 may be of any suitable type, desirably actuated by air cylinders controlled by controller 76.

All components illustrated in FIG. 3 are controlled by controller 76. This includes the drive 30 for centrifugal blower 22, heating element 23, the various gates that control the flow of resin downwardly through the dryer, the load cells that detect weight thereby allowing the computation of amount of material flowthrough, and the like. Controller 76 controls all aspects of the operation of the dryer and once the dryer is started, human intervention is not necessary. Of course, controls provided on controller 76 to allow human intervention if desired.

Conventional industry practice is to dry, then blend, and then process granular resin material using a desiccant dryer, then a gravimetric blender and then a molding machine. The dryer of the invention facilitates reversal of the first two stages of that process, namely permitting drying to be done after measuring and blending. This is advantageous because of problems associated with desiccant dryers including separation of the blend resulting in a large quantity of resin material being already preblended that might not be usable in the event of such separation. This is the reason desiccant dryers are conventionally used prior to or upstream of gravimetric blenders in the plastics molding industry. Since the invention facilitates drying of granular material after the measuring and blending of such material, the invention eliminates risk involved in storing preblended material, namely separation of the blend which may render the material unusable.

With dryers of the invention, removal of moisture is on the order of $2/10$ of 1% of the weight of the material so there is no adverse effect on the blend or on the proportions of the blend that have been effectuated by a gravimetric blender positioned upstream of a dryer in accordance with the invention.

Dryers in accordance with the invention uniformly and consistently exhibit a six-fold reduction in drying time over that experienced using conventional desiccant dryers when drying granular plastic resin material prior to molding or extrusion. Such conventional desiccant dryers rely entirely on blowing warm air over the plastic material and having the warm, dried air absorb moisture out of the plastic material of interest.

In the dryers according to the invention, especially the embodiments shown in FIGS. 1 and 2, the vacuum drawn during the drying process can be as low from one to three inches of mercury short of absolute vacuum. Hence, under standard conditions these dryers preferably develop a vacuum of from 27 to 29 inches of mercury in the vacuum drying canister.

Preferably a dryer supplies hot air to heat granular resin material at fill and heat position 100 at a temperature as high as 260° F. or even as high as 300° F.

In a typical application where a molding machine may require 100 pounds per hour of processed, dried, ready to mold plastic resin, a dryer in accordance with the invention can supply about 105 pounds of material per hour, ready to be processed by the molding machine.

For a molding machine operating with a conventional desiccant dryer supplying granular resin material at the same 100 pounds of material throughput per hour, a desiccant dryer having capacity of 400 pounds would be required in order to provide the 100 pounds per hour of material, due to the four hour desiccant drying time.

Dryers in accordance with the invention take up less space and generally provide a more efficient operation for a molder than a conventional desiccant dryer.

A desiccant dryer process requiring 100 pounds throughput of material per hour requires a four hour lead time since such a desiccant dryer typically requires four hours to provide the first batch of material at acceptable dryness. In contrast a dryer in accordance with the invention only needs 40 minutes or less to provide the first batch of material at acceptable dryness for startup of the molding operation.

A new color may be introduced into the drying procedure while the preceding color or final batch of plastic resin material with the preceding colors is being dried and delivered. Hence there is no interruption in operation of the dryers of the invention in order to change colors of the granular resin material being dried. In contrast, a conventional desiccant dryer would require four hours of down time in order to change the color of the granular plastic resin being dried.

Dryers in accordance with the invention make economical the recycling of nylon scrappage which heretofore has been practical due to the drying time required for such scrappage. When nylon is conventionally processed and scrap nylon results as a byproduct of the process, in some cases it may take up to three days, using known methods and equipment, to dry the scrap nylon to a sufficient extent that the nylon can be reground and reprocessed. A dryer in accordance with the invention has been tested experimentally on such nylon recycle and has been found to adequately process the nylon recycle in six hours, amounting to a 92% reduction in drying time over that known heretofore. Hence, use of a dryer in accordance with the invention may provide a source of continuous supply of dried reprocessable nylon for recycling which has heretofore not been practical due to the affinity of nylon for moisture and the length of time it has taken to dry nylon recycle to a sufficient degree to make it processable in a recycling mode.

Another important advantage of the invention is that plastic resin material being dried is exposed to heat for a much shorter time than with known methods, thereby reducing the risk of plastic degradation due to exposure to heat. Many molding materials, especially more expensive molding materials, are highly sensitive to exposure to heat. These materials, commonly referred to as "engineering" materials, include nylon, PET and various polycarbonates.

The foregoing describes the preferred embodiment and alternate embodiments of the invention and sets forth the best mode contemplated for carrying out the invention in such terms as to facilitate practice of the invention by a person of ordinary skill in the art. However, it is to be understood that the invention has many aspects, is not limited to the structure, processes, methods and embodiments disclosed and/or claimed, and that equivalents to the disclosed structure, processes, methods, embodiments and claims are within the scope of the invention as defined by the claims appended hereto or added subsequently.

In the claims, "comprising" means "including, but not limited to", while "consisting of" means "having and no more", with both definitions being in accordance with conventional patent application prosecution procedure in the United States Patent and Trademark Office.

What is claimed is:

1. An apparatus for drying granular resin material prior to molding or extrusion processing thereof, comprising:
   a. a heating chamber;
   b. a vacuum chamber below the heating chamber;
   c. a retention hopper below the vacuum chamber;
   d. a blower for supplying heated ambient air upwardly through the heating chamber;
   e. a conduit for introducing dry purge air into the vacuum chamber; and
   f. a conduit for introducing blanketing dry air into the retention hopper.

2. An apparatus of claim 1 further comprising:
   a. a first support bearing the weight of the heating chamber; and
   b. a second support bearing the weight of the vacuum chamber.

3. An apparatus of claim 2 wherein the vacuum chamber is suspended from the second support.

4. An apparatus of claim 2 wherein the first and second supports are connected.

5. An apparatus of claim 1 further comprising:
   a. a heater for heating ambient air for introduction into the heating chamber, comprising:
      i. a hollow housing; and
      ii. an electrical heating element within the housing.

6. An apparatus of claim 1 further comprising:
   a. a first gate between the heating chamber and the vacuum chamber, movable between an open and closed positions, for controlling downward resin flow into the vacuum chamber;
   b. a second gate between the vacuum chamber and the retention hopper, movable between open and closed positions, for controlling downward resin flow from the vacuum chamber into the retention hopper.

7. An apparatus of claim 6 further comprising:
   a. a plurality of first gates between the heating chamber and the vacuum chamber, movable between an open and closed positions, for controlling downward resin flow into the vacuum chamber;
   b. a plurality of second gates between the vacuum chamber and the retention hopper, movable between open and closed positions, for controlling downward resin flow into the retention hopper.

8. An apparatus of claim 7 wherein the plurality of first gates includes at least one slide gate.

9. An apparatus of claim 7 wherein a first one of each of the two pluralities of gates are connected to the vacuum chamber.

10. An apparatus of claim 6 wherein the first gate is a slide gate.

11. An apparatus of claim 1 further comprising a sensor for sensing weight of the vacuum chamber and any resin material therein.

12. An apparatus of claim 7 further comprising a sensor for sensing weight of the retention hopper and any resin material therein.

13. An apparatus of claim 2 further comprising a frame connected to the first and second supports.

14. An apparatus of claim 1 wherein sensors are load cells.

15. An apparatus of claim 1 further comprising:
   a. an adjustable blower for blowing warm air through a heater and into the heating chamber;
   b. a sensor for detecting air temperature at the top of a heating hopper; and
   c. a control for adjusting speed of the blower in response to the detected air temperature.

16. A method for drying granular resin material prior to processing thereof by molding or extrusion, comprising:
   a. heating granular resin material in a heating hopper;
   b. monitoring air temperature at the top of the heating hopper;

c. regulating heat input to the heating hopper so that monitored air temperature at the top of the heating hopper does not exceed a preselected temperature;
d. releasing heated granular resin material from the heating hopper for flow downwardly into a vacuum chamber while replenishing the heating hopper from above with fresh resin material in an amount substantially equal to that released into the vacuum chamber;
e. drawing vacuum in the vacuum chamber while periodically purging the vacuum chamber with dry air;
f. draining resin material from the vacuum chamber into a retention hopper;
g. blanketing resin material in the retention hopper with dry air.

17. The method of claim 16 wherein regulating heat input to the heating hopper further comprises regulating speed of air passing a heating element.

18. The method of claim 16 wherein heating the granular resin further comprises introducing heated ambient air into the heating hopper.

19. The method of claim 18 wherein heating granular resin material in the heating hopper further comprises introducing heat into the heating hopper at the heating hopper bottom.

20. The method of claim 16 wherein purging the vacuum chamber with dry air comprises:
a. passing compressed air along a membrane dryer;
b. introducing the compressed air into the vacuum chamber at the bottom of the vacuum chamber.

* * * * *